United States Patent [19]
Reece et al.

[11] Patent Number: 5,895,624
[45] Date of Patent: Apr. 20, 1999

[54] METHOD AND APPARATUS FOR FORMING THICK WALL PLASTIC SHEETS HAVING FORMABLE DECORATIVE FILM LAYERS

[75] Inventors: Edwin G. Reece; Robert A. Reece; Gregory J. Masserang, all of Clarkston, Mich.

[73] Assignee: Android Industries of Michigan, LLC, Whitmore Lake, Mich.

[21] Appl. No.: 08/788,131

[22] Filed: Jan. 24, 1997

Related U.S. Application Data

[60] Provisional application No. 60/020,447, Jun. 18, 1996.

[51] Int. Cl.$^6$ .................................................. B29C 43/14
[52] U.S. Cl. .................... 264/554; 264/163; 264/292; 264/296; 264/318; 425/388; 425/DIG. 48; 425/DIG. 58
[58] Field of Search ........................... 264/544, 550, 264/554, 292, 294, 296, 318, 163; 425/388, 398, 292, DIG. 48, DIG. 58

[56] References Cited

U.S. PATENT DOCUMENTS

| | | | |
|---|---|---|---|
| 3,465,071 | 9/1969 | Edwards | 264/550 |
| 4,261,775 | 4/1981 | Tschudin | 264/554 |
| 4,674,972 | 6/1987 | Wagner | 264/554 |
| 4,822,553 | 4/1989 | Marshall | 264/318 |
| 4,943,406 | 7/1990 | Bocchi | 264/554 |
| 5,454,707 | 10/1995 | Mitchell et al. | 264/550 |

*Primary Examiner*—Jan H. Silbaugh
*Assistant Examiner*—Mark Eashoo
*Attorney, Agent, or Firm*—Rader, Fishman & Grauer PLLC

[57] ABSTRACT

Method and apparatus for forming thick wall plastic components laminated with formable decorative film layers. A thermoformable thick wall plastic sheet in the range of 0.065 to about 0.300 inches thick over at least half its area is provided having a thermoformable decorative dry film coating on one side forming an outer surface of the laminated sheet. The sheet is peripherally supported in an open center rack, heated in one or more ovens to forming temperature and formed by a combination of compression and, preferably, vacuum forming with subsequent trimming of excess material to form a finished component with a high quality finish suitable for automotive body use. The compression and vacuum forming steps may be interchangeably performed in order and provide for high quality finish on the outer surface with shaping of reentrant wall portions on the inner side. Any suitable form of laminated sheet may be formed by the apparatus and method. A preferred material is a laminated sheet with the decorative film covered with a thermoformable protective film which is retained during forming and protects the finished component until ready for service when it may be removed. To prevent finish marks due to compression forming, a removable outer protective coating or film may be used to protect the smoothness of the first protective layer and/or the decorative film coating until ready for forming when the outer film is removed.

18 Claims, 12 Drawing Sheets

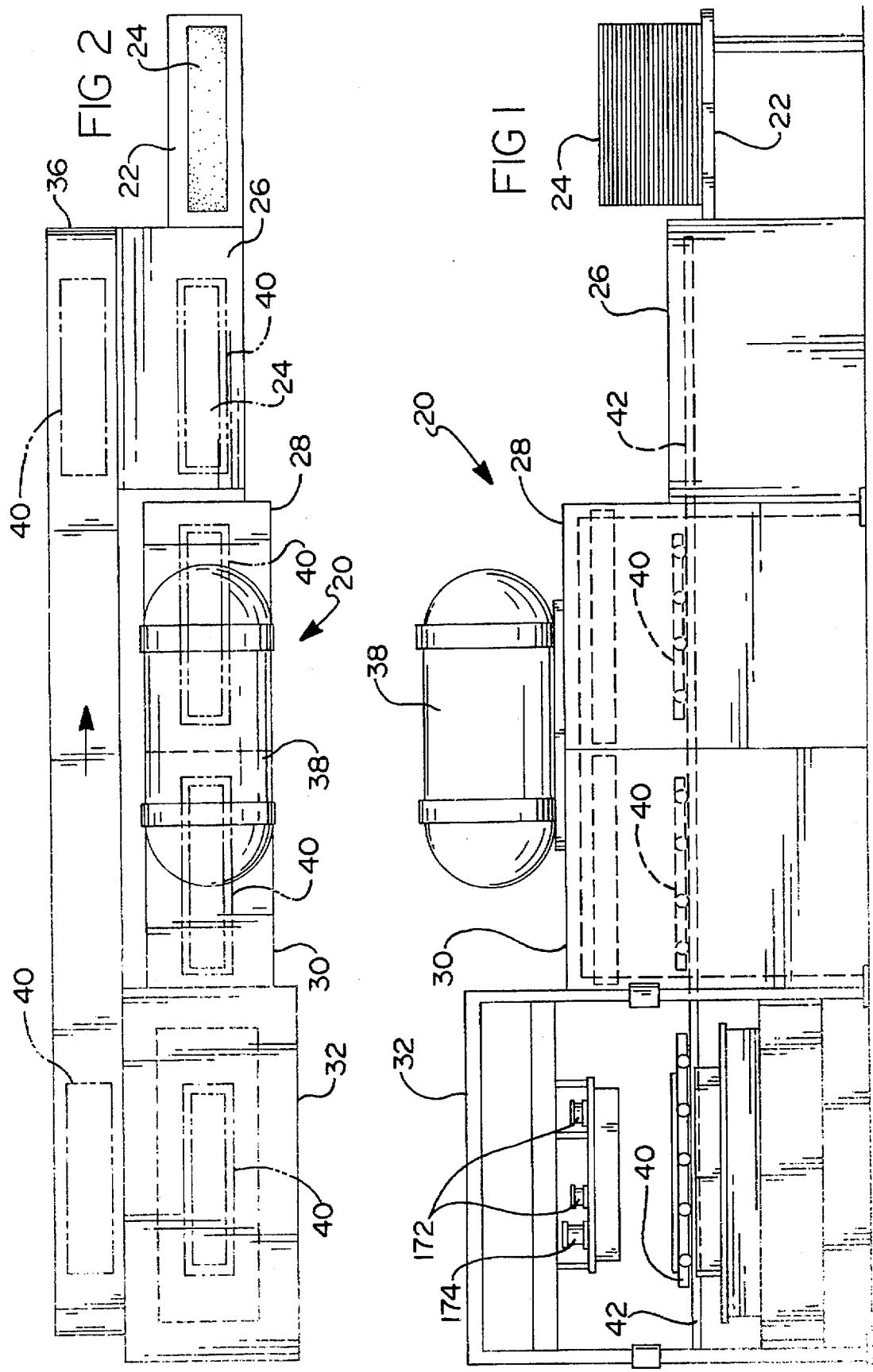

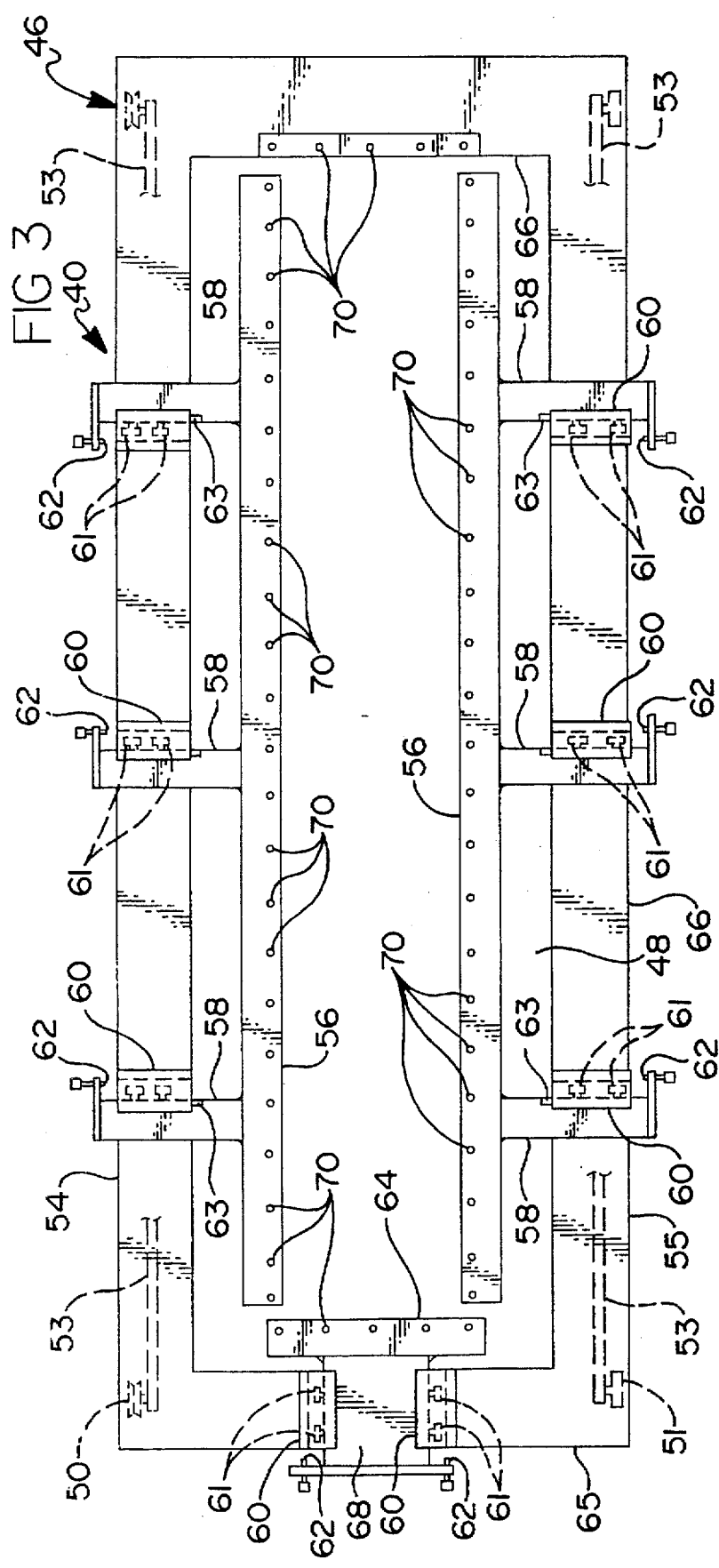
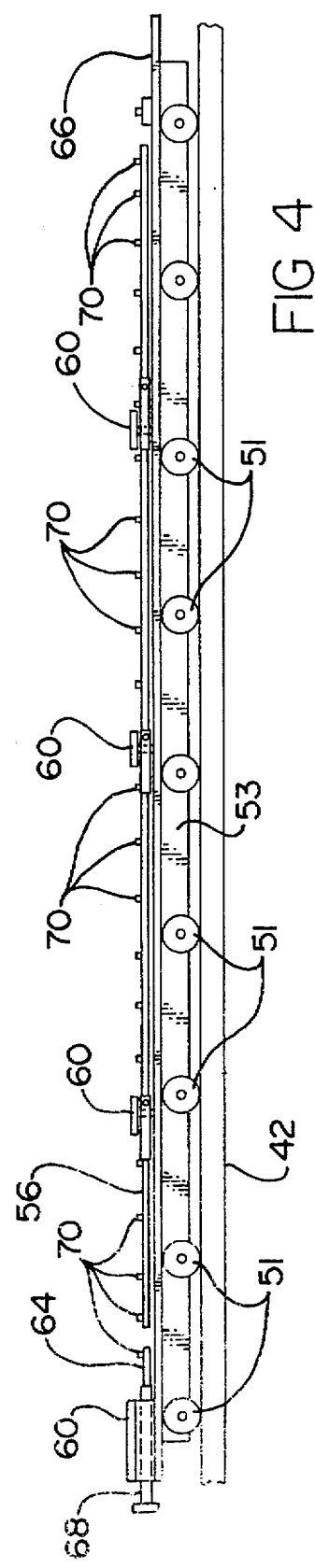

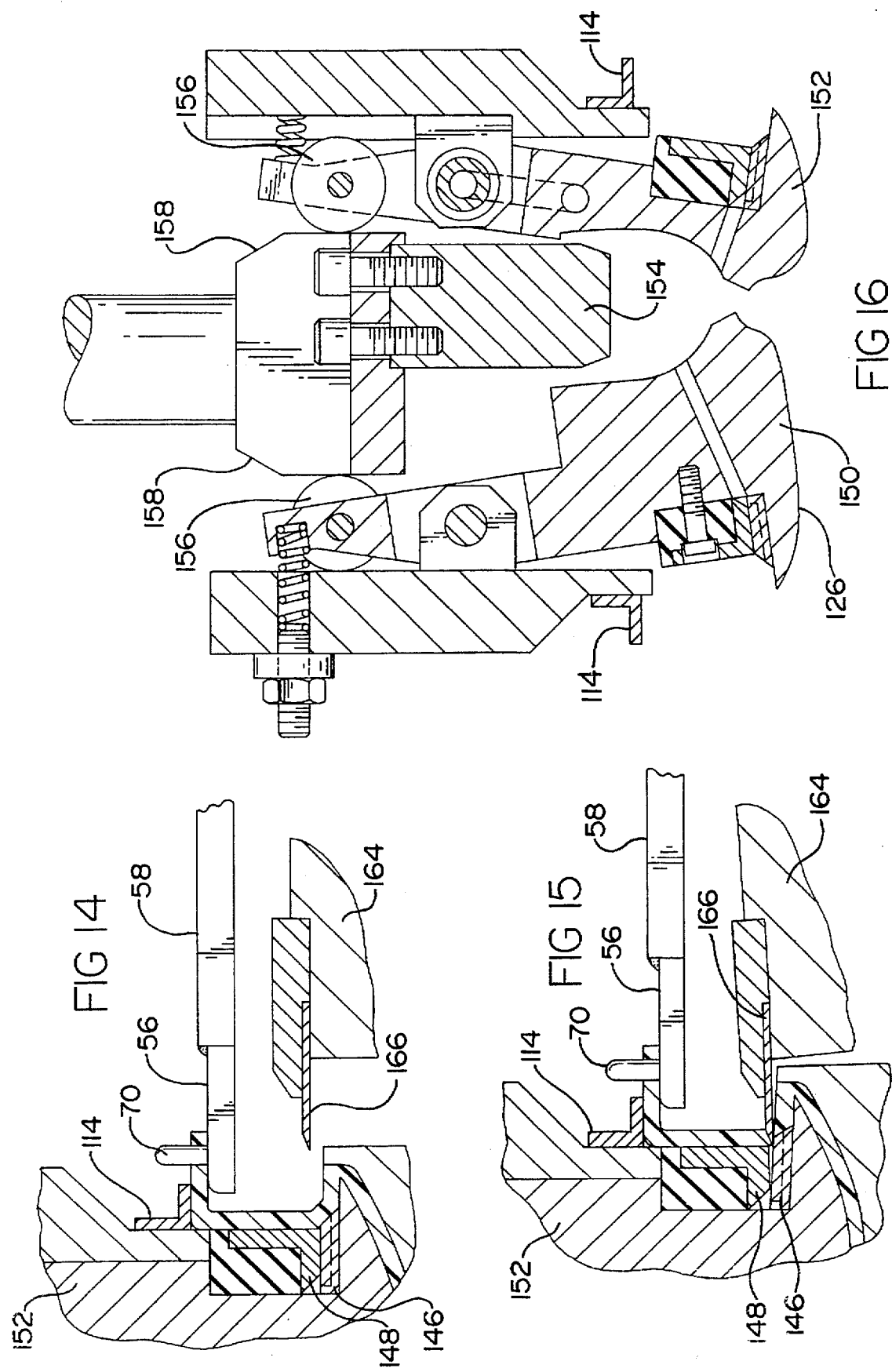

METHOD AND APPARATUS FOR FORMING THICK WALL PLASTIC SHEETS HAVING FORMABLE DECORATIVE FILM LAYERS

CROSS-REFERENCE TO RELATED APPLICATIONS

This application claims the benefit of U.S. Provisional Application Ser. No. 60/020,447 filed Jun. 18, 1996.

FIELD OF THE INVENTION

This invention relates to methods and apparatus for forming of thick wall plastic sheets laminated with formable decorative film layers to provide high quality exterior surfaces for use as panels, trim components and other products such as for vehicles and other uses.

BACKGROUND OF THE INVENTION

It is known in the art to manufacture fascias, trim components, and other plastic panels for use in vehicle bodies and the like by injection molding to form the panel with a desired shape and exterior surface quality. It is also known to form panels with coated exterior surfaces by preforming a paint film or, other film coating, shaped to the desired configuration of the panel exterior surface. The preformed film is then placed in an injection molding die, after which the vehicle body panel is formed in the mold with the paint film adhering to and forming the outer surface. Paint films for this process may be made by forming a thin sheet of film coating and then vacuum forming this sheet to the desired configuration on a vacuum forming tool. This process then requires provision of both vacuum forming equipment for shaping the film and injection molding equipment for forming the panel to provide the desired high quality exterior surface coated body panels or fascias for vehicles and the like.

SUMMARY OF THE INVENTION

The present invention significantly simplifies the process of forming thick plastic body panels and the like having high quality exterior surfaces. In its basic form, the method includes:

a. providing a thick wall plastic sheet at least partially laminated with a stretchable decorative film.

b. heating the laminated sheet to a suitable working temperature.

c. forming the preheated laminated sheet to a desired contour and surface finish of the decorative film.

A thick wall sheet, as referred to herein, is characterized by a thickness of at least about 0.065 inches. Preferably a maximum thickness of about 0.300 inches will be maintained although greater thicknesses may be utilized where practical. The decorative film may be any suitable form of stretchable coating such as pigmented paint, automotive clear coat, wood grain, ink, chromium, and other metals. A typical thickness for the film would be about 0.0015 inches although other thicknesses could be used.

The heating temperature, or range of temperatures, may vary with the materials and methods of forming to be used. The temperature resistance of the decorative coating must also be considered.

Any suitable forming method may be used as long as it provides the needed detail and shaping of the sheet and the desired surface finish for the decorative film side of the laminate which constitutes the outer surface of the resulting component and is visible in its ultimate use.

Forming processes presently preferred for optional use in carrying out the invention include compression forming and thermoforming (or vacuum forming) as well as combinations of these processes. Certain specific examples of forming methods using these processes may be helpful in indicating the scope of the invention and various optional and/or selectable steps which may be used therewith.

Either process requires the provision of a thick wall laminated plastic sheet which is currently becoming available from known suppliers of plastic laminates. To provide this, a thick wall thermoplastic sheet may be purchased or made by any suitable process. For example, such a sheet may be extruded from bulk plastic material using a plastic sheet extruder. The selected thickness of the sheet will depend upon the component to be formed and may vary from a minimum of about 0.065 inches to any desired maximum, 0.300 inches presently being considered a practical limit although not an ultimate one. The thick wall sheet forms a substrate and may be made from any suitable formable material such as filled and unfilled polyethylene, polyolefin (TPO), and polypropylene. Such thick wall sheets may be used immediately in the subsequent process steps or may be trimmed into individual sheets for subsequent use. Sheet plastic for this purpose may also be obtained from outside suppliers.

The plastic sheet is provided to a film applicator along with a decorative film, preferably in roll form, which is laminated to the thick wall substrate by rolling the two together under conditions of heat and pressure suitable for forming a flexible laminate. A thin bonding layer may be used to help bond the film to the substrate. The decorative film may include one or more layers of pigmented paint, clear coat, wood grain, ink, chromium or other metals and materials as desired. For an automotive application, the film will likely include a color layer covered by a layer of clear coat, the two layers having a total thickness of, for example, about 0.0015 inches. Currently such decorative films may be provided by vendors on a carrier film such as mylar film having a thickness of about 0.002 inches. The carrier layer is stripped from the decorative film coating either prior to or after its lamination to the thick wall substrate.

If desired, the decorative film may additionally be provided with a first formable protective layer and optionally a second protective layer covering the first protective layer. The outer layer, whether a first or second protective layer, will preferably act as the decorative film carrier. If the decorative film is supplied by an outside vendor, the carrier layer, if used, will, prior to any further processing, be removed from the laminated thick wall plastic sheet having the decorative film layers applied.

To form a laminated thick wall plastic sheet into an automotive panel or trim component, the following steps are or may be performed:

1. The decorative laminated sheet is loaded into a rack or similar sheet holding device and clamped in place in a generally stretched condition. If the sheet has been provided with an outer protective coating, such as the second protective coating layer previously mentioned, to prevent damage to the under layers during handling, this outer layer is preferably removed prior to loading into the rack.

2. The sheet carrying rack is moved into an oven where the sheet is heated to a desired forming temperature.

3. The racked sheet is moved from the oven to a forming station in which an inner male die or mold is moved against the inner side of the sheet for subsequent compression forming, in combination with thermoforming, or an alternate forming method.

4a. For compression forming, a mating die is closed upon the sheet and mechanical pressure is applied to compress both sides of the sheet surface. The pressure is sufficient to mold the decorative surface of the sheet and form therein any design features, logos or identifying symbols that may be desired in the part.

5a. If the component requires the formation of reentrant retaining edges, a multi-sectional or collapsing mold is utilized and the edges of the sheet are wrapped around the mold edges through vacuum forming or mechanical action of supplemental mold devices. This may occur in conjunction with trimming the edges of the sheet with knife blades or other suitable means which may assist in the mechanical forming action of the part edges.

4b. In the case of thermoforming or vacuum forming of the main component, the heated sheet is moved against a vacuum forming mold which is preferably positioned to stretch the heated sheet around the mold outer surface. For this purpose, it may be necessary to use movable supports or clamps, or an articulating rack to move the edges of the sheet more fully around the mold surface. Thereafter, vacuum is applied to draw the heated sheet against the mold surface and form it to its desired general configuration. In this process, the decorative film side of the sheet is located on the outer surface away from the vacuum forming mold.

5b. To improve the finish of the outer surface and to form therein sharp details of design features, logos, etc. which may be desired, an outer die is preferably used which is moved against the outer surface of the formed component using mechanical pressure to form the surface details as desired. A multi-piece die may be used if required by the complexity of the finished part.

6b. Two or three dimensional trimming of the edges of the part will preferably be accomplished while the part remains on or in the mold, although the component could be removed or trimmed in another location. Trimming may be accomplished by knives or other devices which move into engagement with the part edges to remove excess material and shape the edges of the part to a desired external condition. If reentrant shapes are required at the part edges, the use of a multi-piece mold which collapses at the edges will be required to remove the part.

7. After trimming and any cooling required, the upper and lower molds are returned to their original positions. The multi-piece inner mold is collapsed and the finished part is unloaded from the inner mold. The forming molds or dies are returned to their original conditions for receiving the next sheet to be formed. Preferably, the first protective layer remains on the decorative film during processing and thereafter for shipment to and assembly into a vehicle in order to protect the surface of the decorative film, be it paint or other material, during shipping and processing. The protective film may be left in place thereafter while the vehicle is delivered to the dealer and may be stripped from the finished part by the dealer prior to delivery to the ultimate customer so that the decorative film remains in undamaged condition until delivery.

It has been determined that the second protective film layer previously mentioned is important for use wherever the manufacturing steps for forming a component from the thick wall laminated sheet involve the use of compression forming of the decorative outer surface. This is because any scratch or other defect which is created in the outer layer of the laminated plastic sheet prior to compression forming is pressed by the forming process into the layers which are covered by the outer sheet. Thus, in order to prevent handling or shipping scratches and marks from creating defective part surfaces, the second protective outer layer is used to protect the thick wall sheet until it is ready for processing. At this time, the outer sheet is removed with any scratches that may have been caused therein and the clean surface, preferably having a first protective layer of film, is placed into the processing sequence for heating and subsequent forming.

These and other features and advantages of the invention will be more fully understood following from the following description of certain exemplary embodiments of the invention taken together with the accompanying drawings.

BRIEF DESCRIPTION OF THE DRAWINGS

In the drawings:

FIG. 1 is a side view of multi-station forming apparatus for forming laminated thick wall plastic sheets in accordance with the invention;

FIG. 2 is a top plan view of the apparatus of FIG. 1;

FIG. 3 is a top plan view of a sheet mounting rack for use with the apparatus of FIGS. 1 and 2;

FIG. 4 is a long side view of the rack of FIG. 3;

FIG. 14 is an enlarged view showing the position of the trimming blade prior to trimming;

FIG. 15 is a view similar to FIG. 14 but showing the position of the trimming blade during trimming;

FIG. 16 is a transverse cross-sectional view illustrating the collapsing male die in its collapsed position;

DETAILED DESCRIPTION OF THE INVENTION

Figure 5:
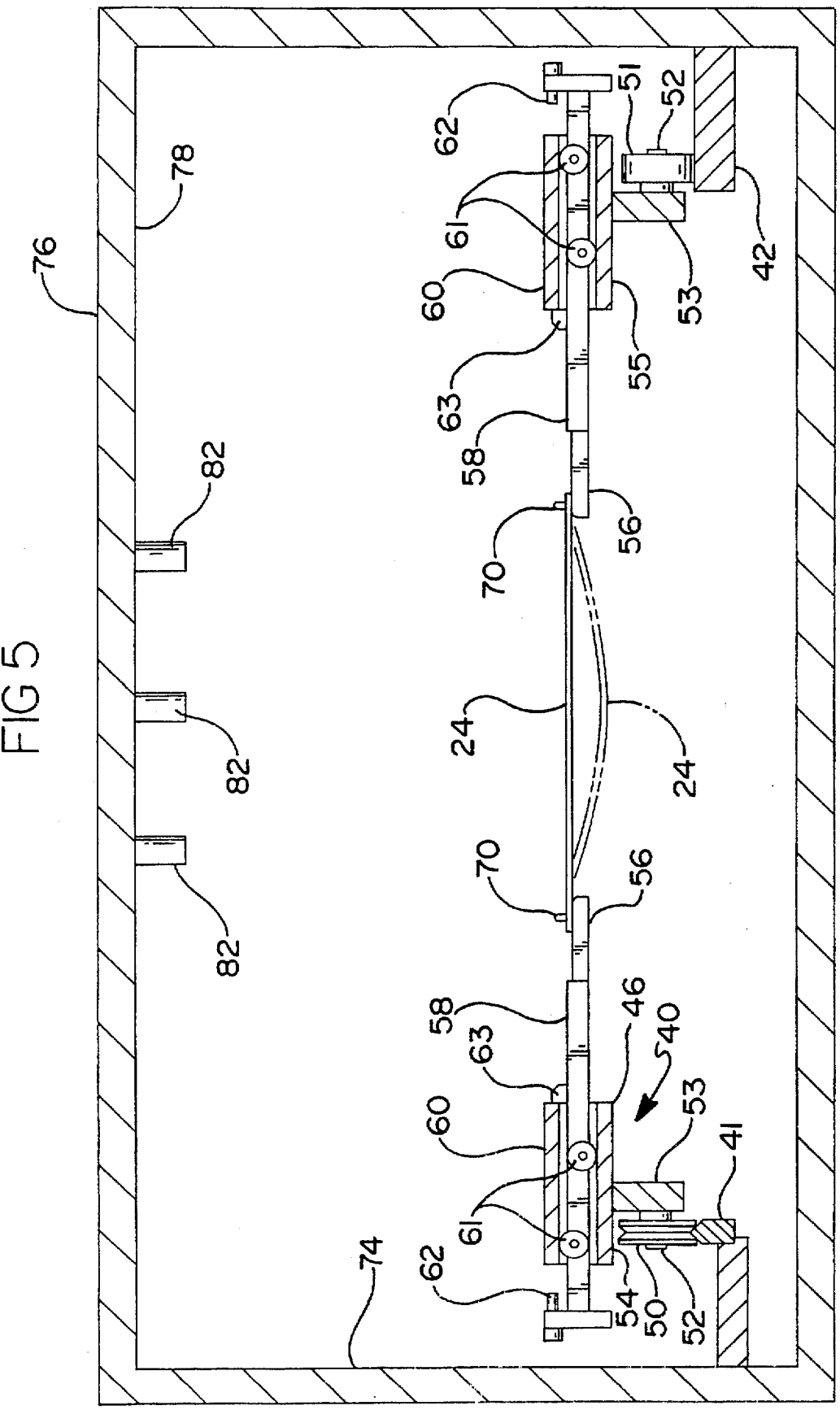
FIG. 5 is a transverse cross-sectional view through the final heat oven of FIG. 1 showing a rack supporting a laminated sheet being heated for forming.

Referring first to FIGS. 1 and 2 of the drawings in detail, numeral 20 generally indicates multi-station forming apparatus in accordance with the invention. Apparatus 20 may include at one end a support table 22 for supporting a stack of laminated sheets 24 having decorative film coatings for processing in accordance with the invention. Adjacent the table 22 is a loading station 26 followed by, in order, a pre-heat oven 28, a final heat oven 30, and a forming station 32. A transfer table not shown may be located at the end of the apparatus adjacent the forming station 32. A return conveyor 36 runs along one side of the apparatus from the forming station 32 to the loading station 26. A vacuum tank 38 may be mounted at any suitable location and is shown on top of the ovens for use and providing vacuum to the forming station 32.

In general operation of the apparatus 20 of FIGS. 1 and 2, a sheet support rack 40 is placed on rails 41, 42 (FIG. 5) in the loading station 26 and one of the laminated plastic sheets 24 is supported in the rack 40 with its decorative dry film coating facing downward. The loaded rack, together with other racks 40 within the apparatus, is then advanced by any suitable mechanism, such as the transfer bar mechanism 43 shown in FIG. 6, from the loading station 26 to the pre-heat oven 28 where the sheet 24 is preheated, as will subsequently be more fully discussed. The loaded rack is then advanced to the final heat oven 30 where heating of the laminated sheet 24 to the desired forming temperature is completed as shown, for example, in FIG. 5 to be subsequently discussed.

After final heating, the loaded rack 40 is advanced to the forming station 32 where the heated sheet 24 is formed and trimmed to provide a finished component 44. After cooling, component 44 is removed from the forming station 32 to the transfer table not shown and the trimmed material is removed to a storage receptacle not shown. The unloaded rack 40 is then moved to the return conveyor 36 and carried to the other end where it is ready for transfer to the loading station 26 when it becomes free in the course of the processing sequence. The process is then repeated. Of course the processing system contemplates the positioning of a rack 40 loaded with a sheet 24 for processing in each of the four stations at any one time, with the multiple ovens being provided to allow adequate time for full heating of the laminated sheet material without holding up the output of the forming station.

Referring now to FIGS. 3–5, each of the racks 40 includes a frame 46 of rectangular flat plate construction and having an open rectangular center 48. The frame 46 is supported by wheels 50, 51 which are rotatable upon axle pins 52 that are fixed in longitudinally extending side beams 53 extending under the opposite longer sides 54, 55 of the rectangular frame 46.

Above the open center 48 and inward of the longer sides 54, 55 are carried a pair of side plates 56. These plates are carried by outwardly extending lateral legs 58 which extend above the frame sides 54, 55 and are trapped below overhanging retainers 60.

Each of the lateral legs 58 carries on one side a pair of laterally spaced guide wheels 61 which ride with clearance between lower surfaces of the retainers 60 and upper surfaces of the frame longer sides 54, 55. Each of the wheels 61 engages one of the surfaces to support the side plates 56 for limited lateral motion relative to the frame sides. Adjustable inward stops 62 and fixed outward stops 63 are mounted on the lateral legs 58 and engage portions of the retainers 60 to limit travel of the movable side plates 56.

In similar fashion, a movable end plate 64 is positioned above the open center 48 adjacent a shorter end 65 of the frame, although a similar construction is missing from the opposite shorter end 66. End plate 64 is supported by a single lateral leg 68 which is carried by two pairs of guide wheels 61 between an upper surface of the shorter end 65 and a lower surface of dual retainers 60 extending over guide wheels 61 on opposite sides of the leg 68. Dual inward stops 62 and outward stops 63 are also provided.

The side plates 56 and the end plate 64 are each provided with a plurality of support pins 70 extending upward from adjacent inner edges of the respective plates and spaced longitudinally along their entire lengths. In this embodiment, the side plates each have twenty-three pins 70 while the end plate has five pins 70. A similar plurality of five support pins 70 are spaced longitudinally along the inner side of the shorter end 66 of the frame where there is no movable side plate. The laminated sheets 24 to be formed by the apparatus of this invention are provided with punched holes 72 along their edges which are received over the pins 70 in order to support the sheets 24 in a rack 40.

The interior construction of the preheat and final heat ovens is generally as shown in FIG. 5. Within insulated enclosing walls 74 and roof 76, there is supported an upper heater 78 including ceramic elements not shown which are controlled externally to heat the laminated sheets delivered there to predetermined temperatures for forming. Temperature probes 82 mounted in the roof 76 and extending through ceramic heater 78 are aimed downwardly at the sheet 24 loaded in the rack 40. These probes sense the surface temperature of the sheet 24 and feed signals to suitable controls in order to control the heat provided by the ceramic elements and obtain the desired controlled heating of the sheet to its forming temperature evenly over the two oven stages. While the laminated sheet 24 is flat and rigid, in its cold condition, as shown in solid lines in FIG. 5, it softens as it reaches forming temperature and tends to sag under its own weight as illustrated by phantom lines in FIG. 5.

Figure 6:
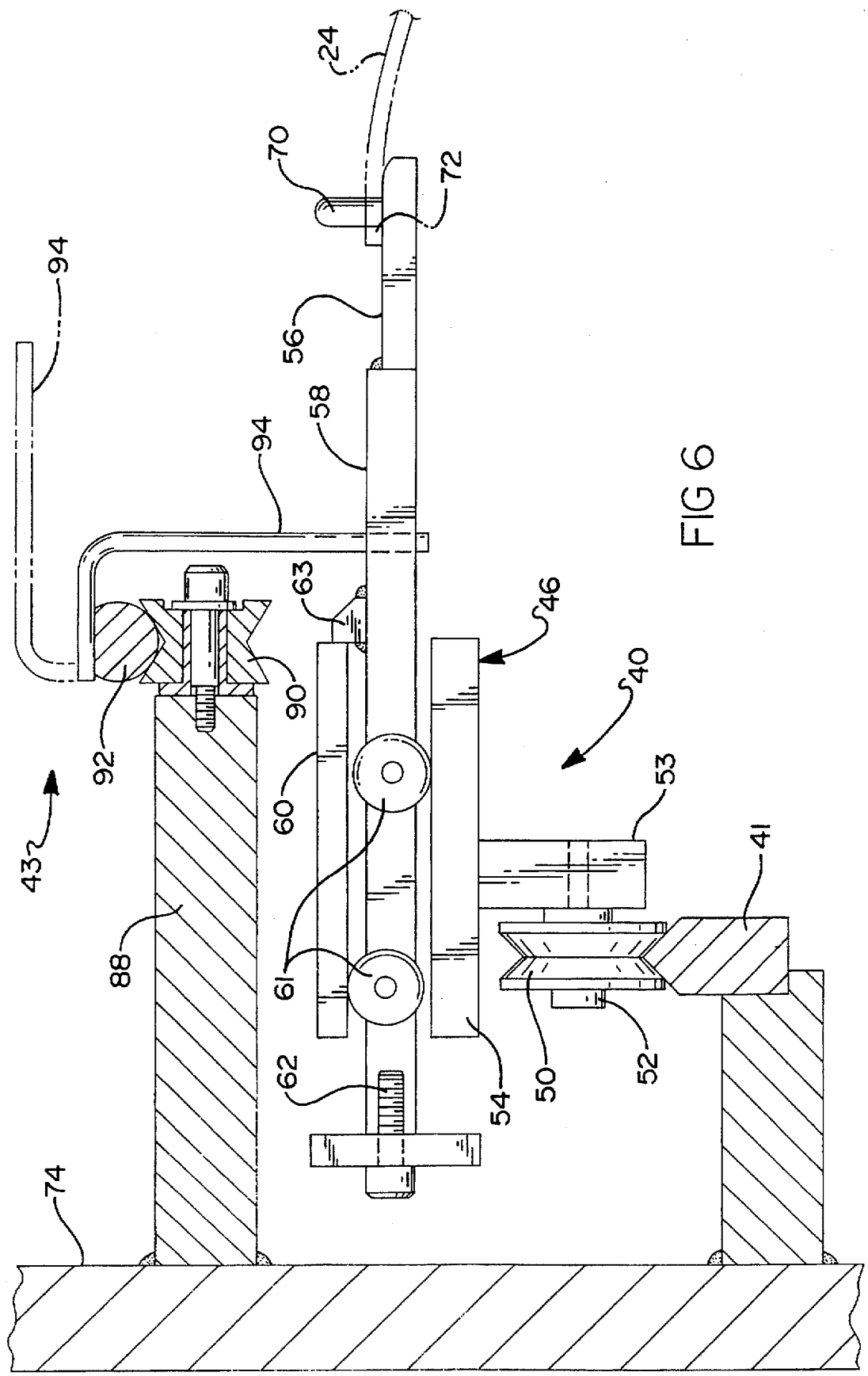
FIG. 6 is a transverse cross-sectional view illustrating a transfer bar mechanism for advancing sheet loaded racks from the loading station through the ovens to the forming station.

FIG. 6 illustrates a transfer bar mechanism which may be used for advancing the loaded racks from one station to another in the disclosed apparatus. As shown, each rack 40 mounts a series of axle pins 52 on which are carried v-wheels 50 and flat wheels 51 (FIG. 5) that ride along the rails 41, 42 secured to the sides 74 of the oven. Above the position of the rack 40, supports 88 carry guide wheels 90 on which is carried a transfer bar 92. Bar 92 mounts spaced fingers 94 which are pivotable between actuating positions shown in solid lines and return positions shown in phantom lines. To advance the racks 40 in the processing apparatus, the transfer bar 92 is rotated clockwise to the position shown in FIG. 6 where the fingers 94 extend downwardly to engage the front and rear ends of racks 40 located in stations 26, 28, and 30. The transfer bar is then advanced longitudinally to move the three racks into the preheat oven 28, final heat oven 30, and forming station 32, respectively. The transfer bar 92 is then rotated counterclockwise until the fingers lie above the bar and are disconnected from the racks, at which time the bar is moved rearwardly to a position above the first three stations 26, 28, 30 and out of the forming station 32 so that the forming process may be performed.

Figure 7:
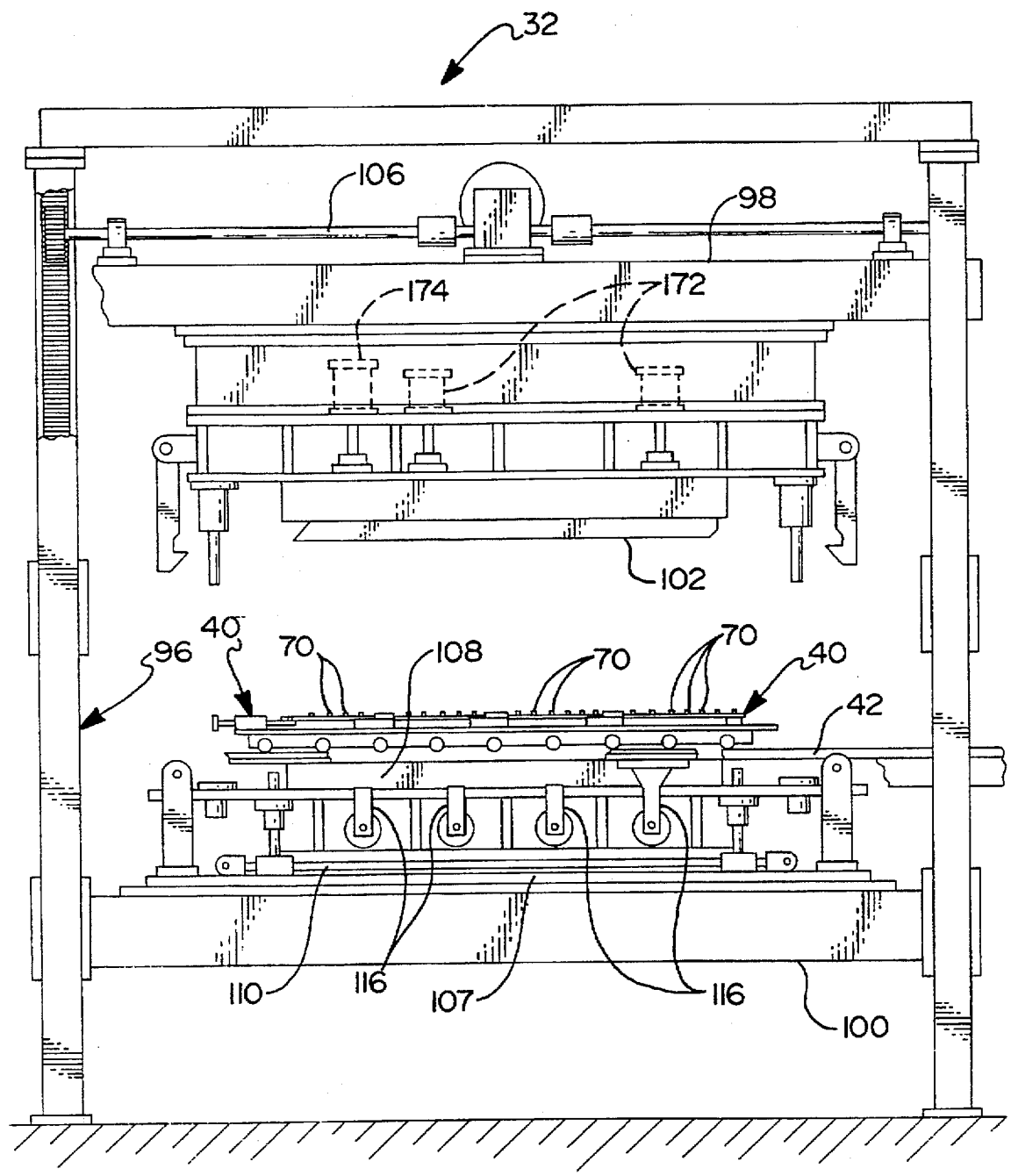
FIG. 7 is an enlarged side view showing details of the forming station of FIG. 1.
Figure 8:
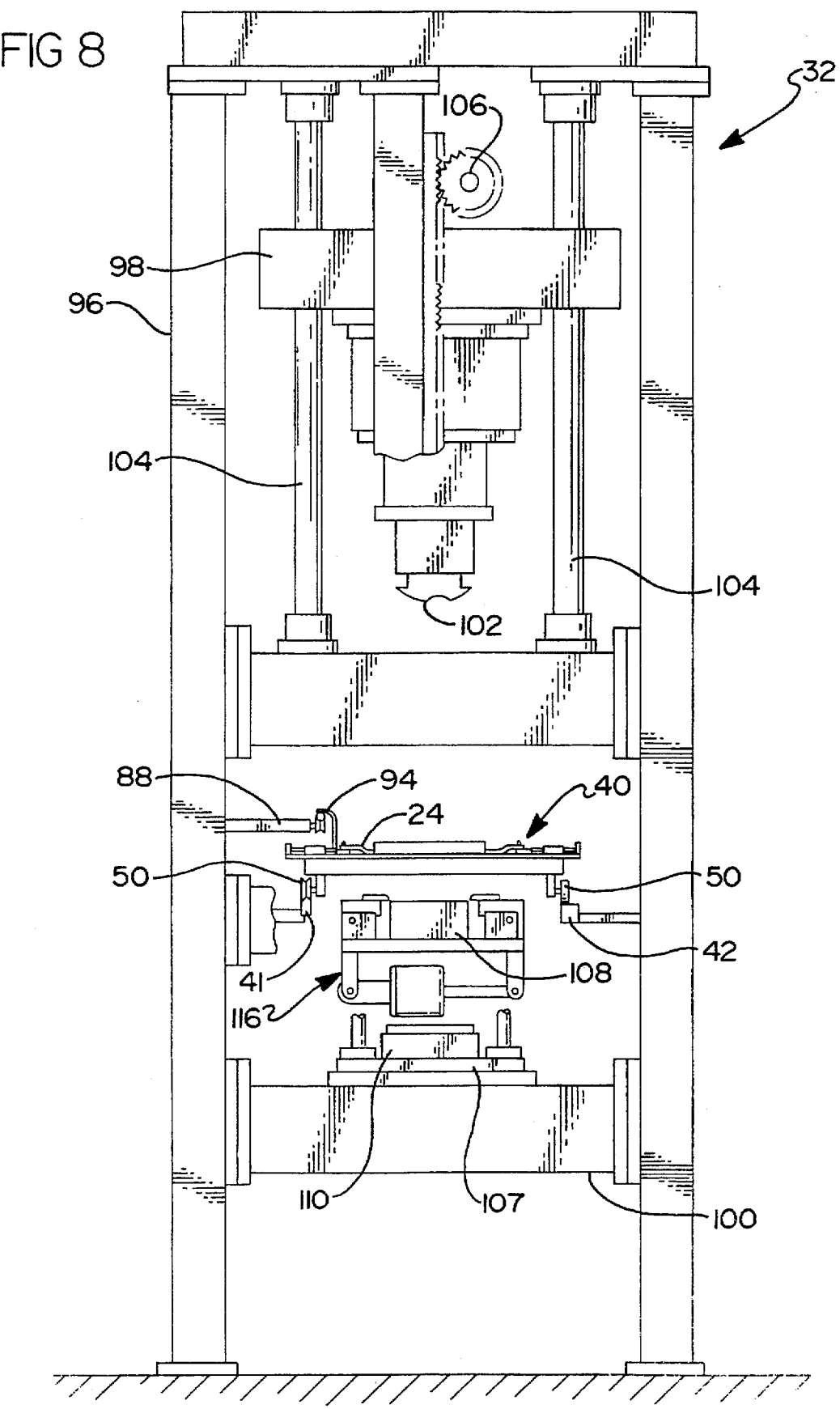
FIG. 8 is an enlarged end view partially broken away to show further details of the forming station of FIG. 1.

FIGS. 7 and 8 illustrate in further detail the features of the forming station 32. Station 32 includes a floor mounted frame 96 supporting a movable upper platen 98 and a stationary lower platen 100. The upper platen carries a male upper mold 102 and is vertically movable along guide bars 104 by a motor driven rack and pinion drive 106 in order to move the upper mold between forming and unloading positions. The stationary lower platen carries a plate 107 on which is mounted a female lower mold 108 actuatable by an air bag 110 operable to raise and lower the female mold into the forming and unloading positions.

Figure 9:
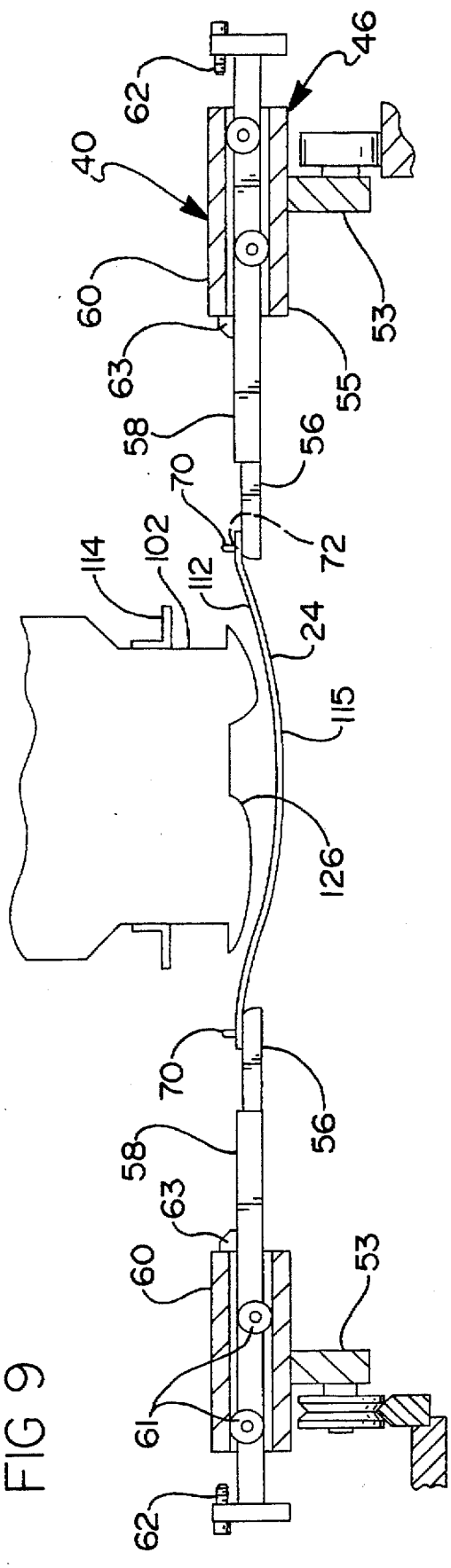
FIG. 9 is a fragmentary end view showing the position of the rack during initial lowering of the male mold.
Figure 10:
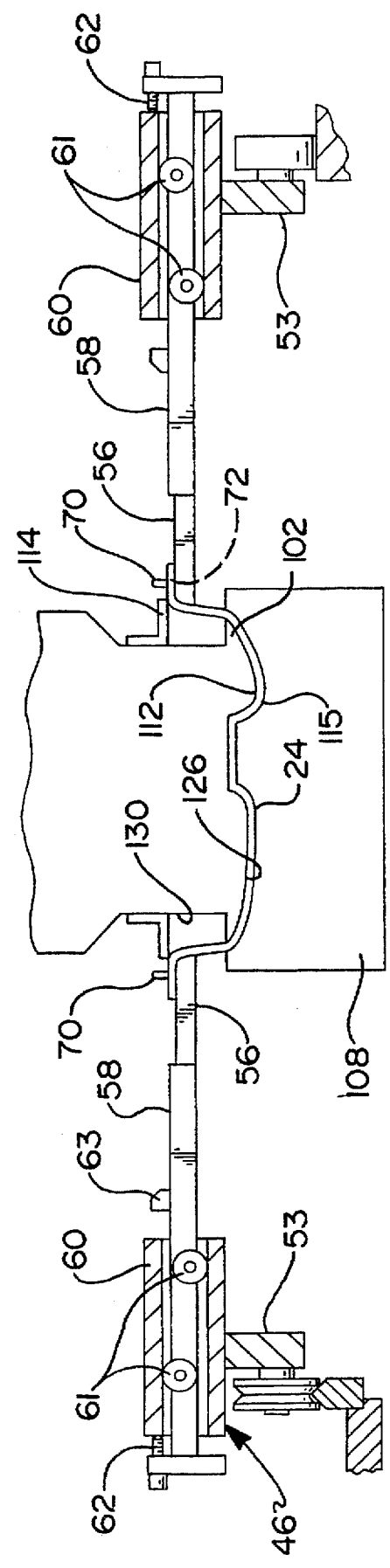
FIG. 10 is a fragmentary end view showing the positions of the rack and molds during the forming operation.
Figure 11:
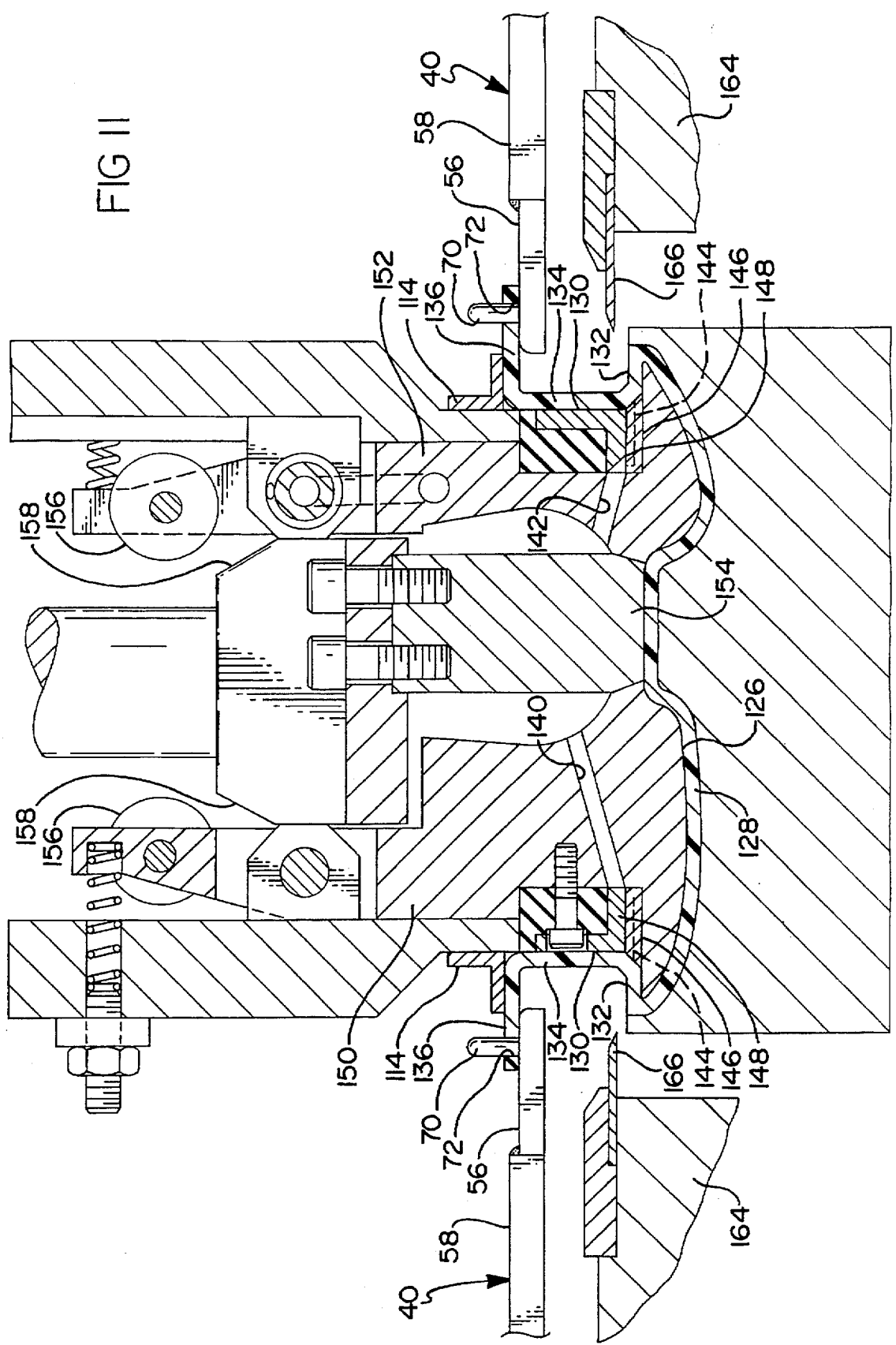
FIG. 11 is a transverse cross-sectional view illustrating the structure and operation of the male and female molds during final forming of a component.

FIGS. 9–11 illustrate progressive steps in the forming of the sheet 24 after the rack 40 has been moved into the forming station 32.

FIG. 9 illustrates a point at which the side plates 56 and the end plate not shown remain in their outer positions while the upper male mold 102 is being lowered toward engagement with an inner (upper) surface 112 of the laminated sheet 24. In FIG. 10, the upper mold has been moved down to its final lower position wherein the upper mold has stretched the laminated sheet 24 downwardly, causing the side plates 56 and end plate not shown to be pulled inwardly against the inward stops 62. At this point, a seal rail 114 mounted on the upper mold 102 engages the sheet 24 inwardly adjacent the plurality of pins 70. In FIG. 10, the lower mold 108 is also shown raised to its upper position engaging the lower surface 115 of the sheet 24 to form this portion of the sheet in a manner to be subsequently described.

FIG. 11 illustrates the positioning of the male and female molds 102, 108 in the forming position together with features of the male mold construction. A laminated sheet 24 is pictured with its upper surface 112 engaged by the male mold 102 and its decorative lower surface 115 engaged for finish forming by the female lower mold 108. The male mold 102 includes a lower surface 126 that is configured to shape the inner side of the component 128 being formed from the laminated sheet. Above its lower edges, the male mold includes recessed portions 130 into which outer portions of the sheet 24 are drawn to form reentrant inner wall portions 132 of the component 128 which extend inwardly toward one another. Portions 132 are connected by vertically extending connecting portions 134 with outer peripheral portions 136 of the sheet 24 that are held on the rack 40 by the retaining pins 70 on which openings 72 are received. The connecting portions 134 of the laminated sheet edges are drawn inward by vacuum applied to the interior of the male mold and distributed through passages 140, 142 in the mold sections and adjacent connecting passages 144 in hardened steel inserts 146. Inserts 146 are located just below resiliently mounted angle shaped hardened inserts 148 mounted in the mold recessed portions 130.

It should be noted that the male mold 102 includes movable side portions 150, 152, as well as a movable end portion not shown. These side portions are maintained in their outward positions during forming by a cam block 154 which in its lower position engages the side portions 150, 152 holding them outward. Side portions 150, 152 are carried on pivot arms carrying rollers 156 which are engageable by cam surfaces 158 that are connected with the cam block 154 for a purpose to be subsequently described. A similar cam block mechanism, not shown, is provided for actuating the movable end portion of the male mold.

Figures 12, 13:
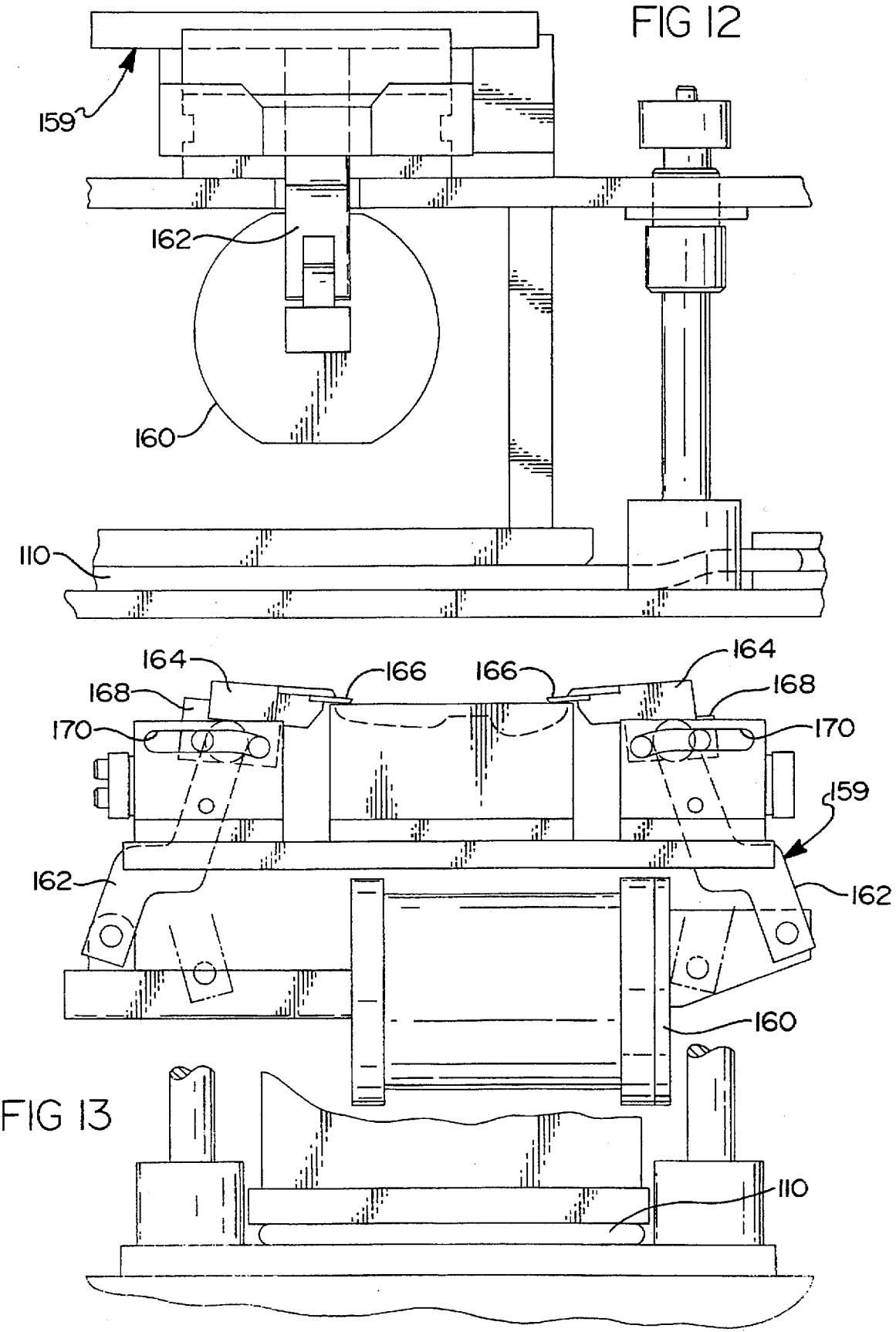
FIG. 12 is an enlarged side view further illustrating a portion of the trimming blade mechanism.
FIG. 13 is an enlarged end view illustrating a portion of the trimming blade mechanism.

FIGS. 11–14 illustrate the structure and operation of a trimming mechanism 159. This apparatus is mounted on the plate 107 which carries the lower mold 108 and includes cylinders 160 actuating pivot arms 162 which drive trimming blade holders 164 that support sharpened steel trim blades 166. The blade holders 164 are carried by follower blocks 168 that slide in cam slots 170. Slots 170 guide the trim blades into a cutting motion that moves them inward and slightly downward to cut through the material of the laminated sheet 24 between the inner wall portions 132 of the formed component 44 and the connecting portions 134 of the laminated sheet outer portions. The slight downward motion of the trim blades 166 smoothes the outer side of the reentrant inner wall portions 132 and allows the blades to slide along the tops of the hardened inserts 146 and under the angle shaped inserts 148. These inserts 148 are resiliently mounted to allow the inserts 148 a slight upward motion which permits the cutting or trimming blade to slide between the two inserts 146, 148 and provide a clean cut of the laminated sheet. These motions are best illustrated in FIGS. 13 and 14.

FIG. 15 illustrates the motion of the male mold 102 when the cam block 154 is raised by cylinders 172 and the end cam block is raised by cylinder 174 shown in FIG. 7. This action raises the cam block 154 above its point of engagement with the side portions 150, 152, after which cams 158 engage rollers 156, pivoting the side portions 150, 152 inwardly until the outer edges of the side portions are moved inwardly a sufficient distance to allow removal of the finished component 128 from the male mold 102. A similar action occurs with respect to the movable end portion not shown of the collapsing male mold 102.

In accordance with the invention, the above described apparatus may be operated to perform the forming of thick wall plastic sheets having formable decorative film layers in the following manner:

A supply of laminated sheet stock 24 is provided on the table 22 adjacent to the loading station 26. Laminated sheets 24 are made from thermoformable thick wall plastic, having a thickness in the range from 0.065 inches to about 0.300 inches over at least half their area and include a thermoformable decorative dry film coating forming an outer surface of the laminated sheet. When the racks 40 already in the apparatus are advanced to the next stations, an empty rack 40 is shuttled into position in the loading station 26 and a laminated sheet 24 is placed in the rack 40 with the punched holes 72 around the periphery of the sheet received over retaining pins 70 of the rack. At the next cycle, the racked sheet 24 with its decorative film coating facing downward is moved into the adjacent preheat oven 28 where its temperature is raised partway to the desired forming temperature. At the next cycle, the preheated sheet is moved into the final heat oven 30 where the sheet temperature is further increased to the desired forming temperature.

At the next cycle, the heated sheet 24 is moved with its supporting rack 40 into the forming station 32. After the transfer mechanism 43 is retracted, the male mold 102 is moved downward with the upper platen as in FIG. 9 toward engagement with the upper inner surface 112 of the laminated sheet 24. Continued motion of the mold 102 to the position of FIG. 10 exerts a force on the sheet 24 that moves the side plates 56 and end plate 64 inwardly so as to move the outer peripheral portions 136 of the racked sheet 24 into closer proximity to the recessed portions 130 of the male mold 102. The seal rail 114 then engages the sheet 24 at its outer peripheral portions to prevent leakage of vacuum from the mold portions 130. Preferably, the female mold 108 is then raised into engagement with the laminated sheet 24 and exerts pressure across the lower surface to mold this portion of the sheet into its final shape and provide a high quality finished surface having the smoothness of the lower mold surface.

Vacuum is then applied to the male mold, drawing the connecting portions 134 of the sheet 24 inward against the recessed portions 130 of the mold and drawing the inner wall portions 132 downward against the upper edges of the male mold recessed portions to shape the reentrant inner wall portions 132 of the formed component 44. The formed component is then trimmed by actuating the trimming apparatus 159 to drive the trim blades 166 against the formed sheet at the juncture of the inner wall portions 132 and connecting portions 134, thereby shearing off the connecting portions 134 and smoothing the inner surface of the reentrant inner wall portions 132 at the point of the trimming cut. When the formed component has sufficiently cooled and the trimming blades have been retracted, the female lower mold 108 is retracted downward and the male upper mold is raised, carrying with it the finished component 44 and the trimmed residue of the sheet 24. The mold 102 is then collapsed by moving the cam block 154 upward, releasing the sides 150, 152 and camming them inward to allow removal of the component 44 from the male mold. Similar action occurs at the end of the part after which the finished component 44 may be removed from the mold and the trimmed surplus residue material is removed from the apparatus. The rack 40 is then returned by conveyor 36 to the loading station 26 for reuse in a subsequent cycle.

In an alternative variation of the forming method just recited, the male mold is moved downward to engagement with the sheet 24 as before. Next the vacuum is applied to the male mold causing vacuum forming of the sheet 24 against the lower portions as well as the recessed upper portions of the male mold. Thereafter, the female mold 108 is raised to compress the decorative lower surface and form it to the detailed shape and finish desired in the finished component 44. After cooling, the trimming and removal operations may be conducted as before.

Figure 17:
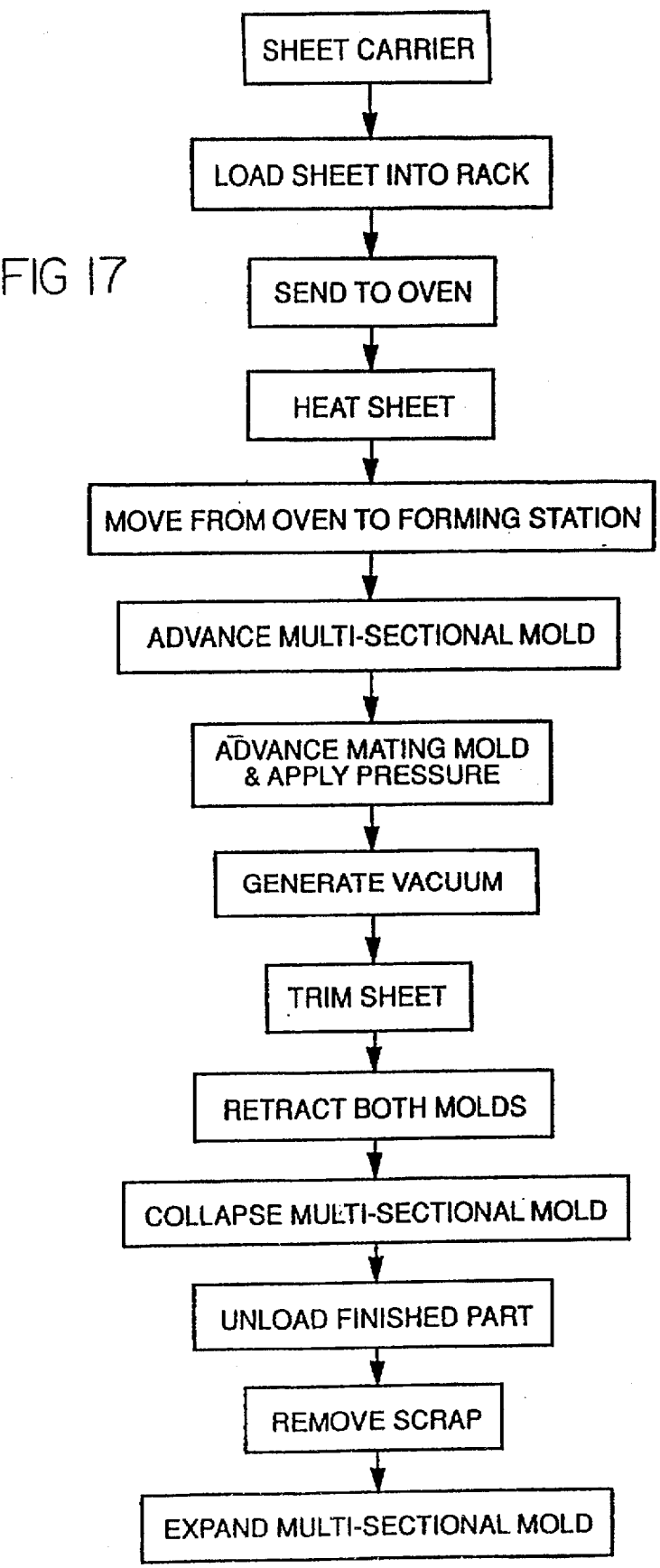
FIG. 17 is a flow chart illustrating the processing steps in a first embodiment of forming process.
Figure 18:
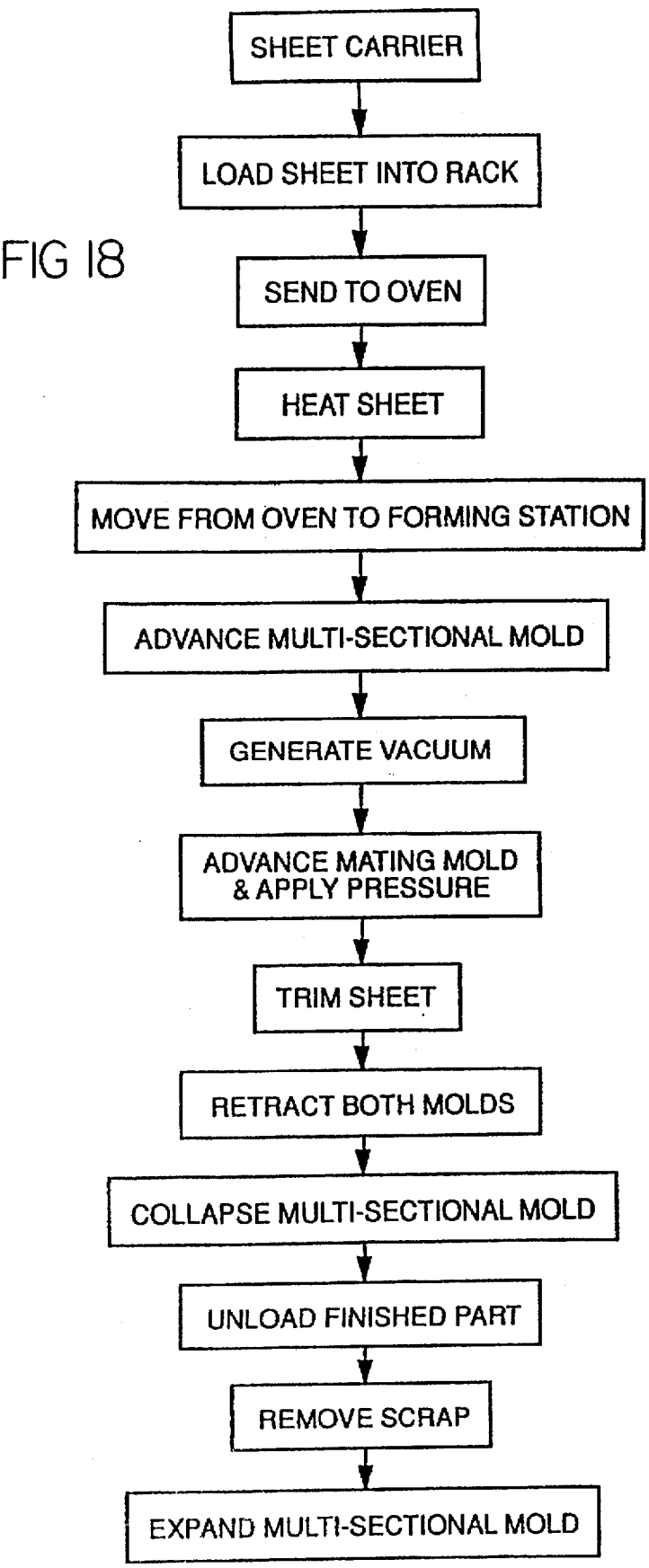
FIG. 18 is a partial flow chart illustrating alternative steps of a second embodiment of the forming process.

FIGS. 16 and 17 present flow charts outlining certain steps of the forming methods just described. From the sheet carrier, a laminated sheet is loaded into a rack and moved through an oven or ovens for heating to forming temperature. At the forming station, the multi-sectional male die is advanced against the heated sheet, forcing it downward. The downward motion of the heated sheet pulls the movable side and end retainers of the rack inward, causing the sheet edges, or peripheral portions, to move inward toward the male die.

Next, in the first embodiment of FIG. 16, the mating female die is advanced and applies pressure to the decorative surface to shape its form and finish after which vacuum is applied to vacuum form the remaining portions of the sheet into the recessed portions of the male die. In a second alternative embodiment of FIG. 17, these steps are reversed by first applying vacuum to vacuum form the component to its approximate shape and the mating die is then advanced and applies pressure to form the outer decorative portions of the component to its final form and finish.

Thereafter the trimming blades are actuated to trim the scrap from the formed component. After adequate cooling, both dies are then retracted, the finished component and scrap being raised with the male die. The multi-sectional male die is then collapsed and the finished component is unloaded. Scrap is removed from the apparatus and the multi-sectional die is expanded in preparation for another cycle.

While the invention has been described by reference to various specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A method of forming a thick wall plastic component laminated with formable decorative film layers, said method comprising:

providing a thermoformable thick wall plastic laminated sheet of determinable area including a stretchable dry film coating forming an outer surface of the laminated sheet;

loading the laminated sheet into a rack having an open center and gripping the laminated sheet along peripheral portions thereof;

heating the laminated sheet in the rack to temperatures suitable for forming of the laminated sheet;

positioning an outer surface of a male mold against an inner surface of the laminated sheet;

compression forming portions of the laminated sheet by forcing an inner surface of a mating female mold against said dry film coating to compress the portions of the laminated sheet between the male and female molds to thereby form the laminated sheet to a configuration defined by the mold surfaces and closely conform the dry film coating of the laminated sheet to a surface detail of the female mold inner surface;

then urging uncompressed portions of the laminated sheet against the male mold; and cooling the laminated sheet after forming to a stable temperature.

2. A method as in claim 1 wherein the urging uncompressed portions comprises vacuum forming.

3. A method as in claim 1 wherein the component includes an outer wall having a decorative outer surface and defining component edges with reentrant inner wall portions extending inward from at least some of the component edges, the urging uncompressed portions displaces said reentrant inner wall portions to positions against first undercut recessed portions of said male mold.

4. A method as in claim 3 wherein the urging uncompressed portions also acts upon connecting portions of the laminated sheet between the peripheral portions and the component edges to displace said connecting portions against second undercut recessed portions of the male mold which are adjacent said first undercut portions.

5. A method as in claim 4 wherein said peripheral portions of the sheet that are adjacent to said connecting portions are shifted inward to assist in positioning said connecting portions against said second undercut recessed portions of the male mold.

6. A method as in claim 5 wherein the urging uncompressed portions comprises vacuum forming.

7. A method as in claim 4 further comprising trimming off the connecting and peripheral portions of the laminated sheet external to said reentrant inner wall portions.

8. A method as in claim 7 wherein the trimming off is performed by means which smooth and compress the reentrant inner wall portions during the trimming off.

9. A method as in claim 8 wherein the trimming off is carried out by a trimming blade after the urging uncompressed portions and before final cooling of the laminated sheet after forming.

10. A method as in claim 1 wherein said film coating includes an outer surface with an appearance that resembles chromium.

11. A method as in claim 1 which said film coating includes a dry paint outer surface.

12. A method as in claim 11 which said film coating includes multiple paint layers.

13. A method of forming a thick wall plastic component laminated with formable decorative film layers, said method comprising:

providing a thermoformable thick wall plastic laminated sheet;

loading the laminated sheet into a rack having an open center;

gripping a peripheral portion of the laminated sheet using a movable support;

heating the laminated sheet in the rack to temperatures suitable for forming of the laminated sheet;

pressing an outer surface of a male mold against an inner surface of the laminated sheet such that said movable support is pulled inwardly;

compression forming portions of the laminated sheet by forcing an inner surface of a mating female mold against the laminated sheet to compress the portions of the laminated sheet between the male and female molds to thereby form the laminated sheet to a configuration defined by the mold surfaces; and cooling the laminated sheet after forming to a stable temperature.

14. The method of claim 13, wherein the component includes an outer wall having a decorative outer surface and defining component edges.

15. The method of claim 14, further comprising trimming off portions of the laminated sheet external to the component edges.

16. The method of claim 15, wherein the trimming off is carried out by a trimming blade before final cooling of the laminated sheet after forming.

17. A method of forming a thick wall plastic component laminated with formable decorative film layers, said method comprising:

providing a thermoformable thick wall plastic laminated sheet of determinable area including a stretchable dry film coating forming an outer surface of the laminated sheet;

loading the laminated sheet into a rack having an open center and a movable support;

gripping a peripheral portion of the laminated sheet using said movable support;

heating the laminated sheet in the rack to temperatures suitable for forming of the laminated sheet;

pressing an outer surface of a male mold against an inner surface of the laminated sheet such that said movable support is pulled inwardly;

compression forming portions of the laminated sheet by forcing an inner surface of a mating female mold against the laminated sheet to compress the portions of the laminated sheet between the male and female molds to thereby form the laminated sheet to a configuration defined by the mold surfaces and closely conform the dry film coating of the laminated sheet to a surface detail of the female mold inner surface; and cooling the laminated sheet after forming to a stable temperature.

18. The method of claim 17, wherein the predetermined thickness is in a range of approximately 0.065 inches to about 0.300 inches.

* * * * *